(12) United States Patent  (10) Patent No.: US 7,796,307 B2
Shiokawa et al.  (45) Date of Patent: *Sep. 14, 2010

(54) IMAGE READING APPARATUS AND COPYING APPARATUS

(75) Inventors: Tsuyoshi Shiokawa, Hachioji (JP); Mitsuru Nagoshi, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 986 days.

This patent is subject to a terminal disclaimer.

(21) Appl. No.: 11/516,085

(22) Filed: Sep. 6, 2006

(65) Prior Publication Data

US 2007/0064286 A1 Mar. 22, 2007

(30) Foreign Application Priority Data

Sep. 20, 2005 (JP) .............................. 2005-271686

(51) Int. Cl.
*H04N 1/04* (2006.01)
(52) U.S. Cl. .................. 358/474; 358/498; 358/493; 358/505; 358/486; 358/496; 399/364; 399/367; 399/371; 271/226; 271/186
(58) Field of Classification Search ................ 358/474, 358/498, 493, 505, 514, 496, 486, 1.13, 448; 399/364, 367, 371, 373, 397, 361, 320; 271/226, 271/225, 10.01, 186, 4.01
See application file for complete search history.

(56) References Cited

U.S. PATENT DOCUMENTS 6,393,251 B2 * 5/2002 Kono .......................... 399/370
6,577,843 B2 * 6/2003 Akita et al. .................. 399/396
6,640,082 B2 * 10/2003 Mitomi ....................... 399/374

(Continued)

FOREIGN PATENT DOCUMENTS

JP 05-183676 7/1993

(Continued)

OTHER PUBLICATIONS

Japanese Notification of Reason for Refusal issued by JPO on Feb. 16, 2010, in connection with Appl. No. 2005-271686, 3 pgs.

(Continued)

*Primary Examiner*—Negussie Worku
(74) *Attorney, Agent, or Firm*—Squire, Sanders & Dempsey L.L.P.

(57) ABSTRACT

An image reading apparatus including: first reading sensor to read an image of an original document at a first position; a second reading sensor at second position downstream; a circulating transport path; a first switchback provided between the first and second positions; a second switchback provided between the second and first positions; a first gate at a branching point of the first switchback; a second gate at a branching point of the second switchback; a sheet exit; a third gate provided at a branching point of the sheet exit; and a controller, which controls such that: the original document is transported through two switchbacks, both face images are read by the two reading sensors; and in another mode, the original document is transported through one of the two switchback sections, and both face images are read by one of the two reading sensors.

8 Claims, 9 Drawing Sheets

U.S. PATENT DOCUMENTS

| | | | |
|---|---|---|---|
| 7,212,321 B2 * | 5/2007 | Sugiyama et al. | 358/498 |
| 2002/0135821 A1 * | 9/2002 | Sekine | 358/498 |
| 2004/0140606 A1 * | 7/2004 | Kobayashi et al. | 271/4.01 |
| 2005/0162712 A1 * | 7/2005 | Shiraishi et al. | 358/474 |
| 2006/0044626 A1 * | 3/2006 | Kishi et al. | 358/474 |
| 2006/0071386 A1 * | 4/2006 | Mizubata et al. | 271/3.14 |
| 2007/0047026 A1 * | 3/2007 | Shiokawa et al. | 358/486 |
| 2007/0080490 A1 * | 4/2007 | Tu | 271/3.14 |
| 2007/0086816 A1 * | 4/2007 | Iwago et al. | 399/367 |
| 2009/0153917 A1 * | 6/2009 | Shiraishi | 358/474 |

FOREIGN PATENT DOCUMENTS

| | | |
|---|---|---|
| JP | 2002-354192 | 12/2002 |

OTHER PUBLICATIONS

Translation of Japanese Notification of Reason for Refusal issued by JPO on Jan. 16, 2010, in connection with Appl. No. 2005-271686, 4 pgs.

* cited by examiner

IMAGE READING APPARATUS AND COPYING APPARATUS

CROSS REFERENCE TO RELATED APPLICATION

The present application is based on Japanese Patent Application No. 2005-271686 filed with Japan Patent Office on Sep. 20, 2005, the entire content of which is hereby incorporated by reference.

BACKGROUND OF THE INVENTION

1. Field of the Invention

The present invention relates to an image reading apparatus and a copying apparatus having the image reading apparatus.

2. Description of Related Art

In an image reading apparatuses for reading double sided original documents, there is a type of reading apparatus in which reading sections are provided at both sides of original document transport path, and by passing the original document through the transport path once, double face reading is conducted.

Patent Document 1 proposes to improve reliability of the image reading apparatus by taking a countermeasure in cases where a reading section is in failure to make reading impossible.

Failures in reading sections are generated, for example, by a failure of image capturing element or attachment of dust such as paper dust on platen glass. In a reading apparatus employing two reading sections, since a failure of any one of the reading sections causes inability of apparatus operation, probability of breakdown by failure becomes twice the case of a reading apparatus employing one reading section, this decreases reliability of the apparatus.

Therefore, such a countermeasure as disclosed in Patent Document 1 is needed.

Patent Document 1: Unexamined Japanese Patent Application Publication No. 2002-354192

In the technology disclosed by Patent Document 1, in cases of double face reading when one of the reading sections is in failure, since an original document is carried to pass three times through a reading position, the reading efficiency is remarkably decreased when one of the reading sections is in failure, which is a problem.

Particularly for the performance, not as an image reading apparatus itself but as a copying apparatus where the image reading apparatus is combined with an image forming apparatus, there is a problem described below.

In cases where the image reading apparatus conducts double face reading by using two reading sections, and the image forming apparatus conducts double face image formation by using reversing transport path, since image forming speed of the image forming apparatus is usually lower than image reading speed of the image reading apparatus, copying operation is conducted according to the image forming speed of the image forming apparatus, the performance of high reading speed in the reading apparatus is not utilized enough. Further, in cases where one of the reading sections is in failure, since the reading speed of the reading apparatus is extremely lowered, the speed performance of the image forming apparatus cannot be utilized.

As the result, the performance of the copying apparatus becomes unsatisfactory.

Further, in the image reading apparatus disclosed by Patent Document 1, in case of failure at one reading section, since reversal transportation of the original document becomes necessary even when single face reading, the problem of decreased reading speed arises.

SUMMARY

A structure reflecting one aspect of the present invention is:

(1) An image reading apparatus including:

a first reading device to read an image of an original document at a first reading position;

a second reading device to read an image of the original document at a second reading position which is located downstream of the first reading position in a transporting direction of the original document;

a circulating transport path which circulates through the first reading position and the second reading position;

a first switchback section provided downstream of the first reading position and upstream of the second reading position in the transporting direction of the original document;

a second switchback section provided downstream of the second reading position and upstream of the first reading position in the transporting direction of the original document;

a first gate to switch a transporting direction of the original document, the first gate being provided at a branching point of the circulating transport path and the first switchback section;

a second gate to switch a transporting direction of the original document, the second gate being provided at a branching point of the circulating transport path and the second switchback section;

a sheet exit path provided downstream of the second reading position in the transporting direction of the original document;

a third gate to switch a transporting direction of the original document, the third gate being provided at a branching point of the circulating transport path and the sheet exit path; and a controller, wherein the controller controls the first gate, the second gate and the third gate such that: in a first mode, the original document is transported through each of the first switchback section and the second switchback section, images on both faces of the original document are read by the first reading device and the second reading device; and in a second mode, the original document is transported through at least one of the first switchback section and the second switchback section, and images on both faces of the original document are read by any one of the first reading device or the second reading device.

A structure reflecting another aspect of the present invention is:

(2) A copying apparatus including:

the image reading apparatus described in structure (1); and an image forming apparatus to form images on both front and rear faces of a recording sheet based on an image data having been read by the image reading apparatus, the image forming apparatus having a reversing transport path to reverse front/rear faces of the recording sheet.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

Embodiments of the present invention will be described below, however, the present invention is not construed to be restricted to these embodiments.

Copying Apparatus

Figure 1:
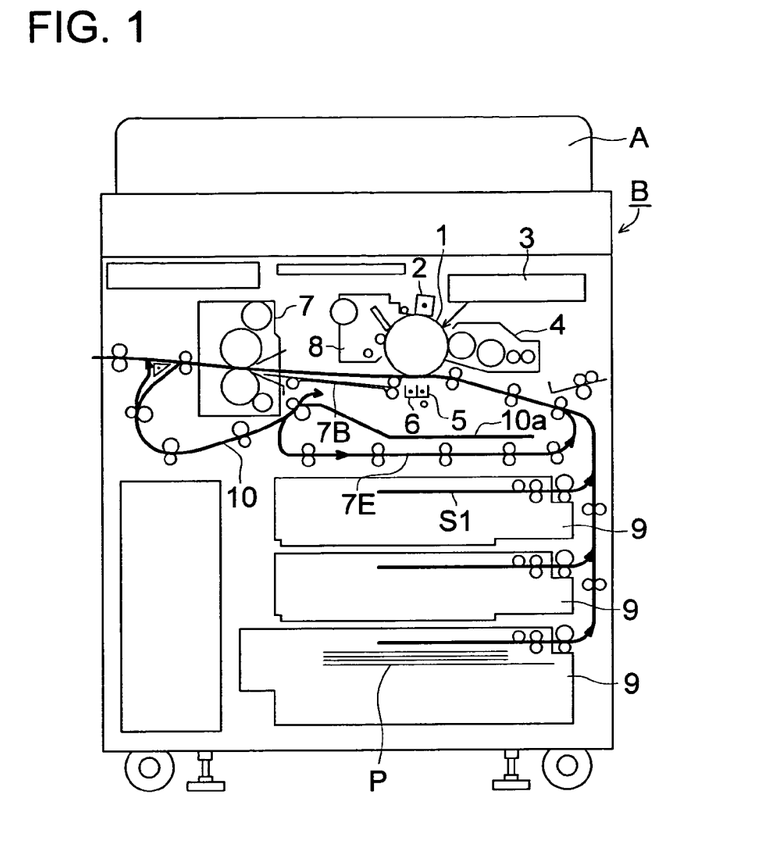
FIG. 1 is an overall diagram of a copying apparatus relating to an embodiment of the present invention.

FIG. 1 shows an overall view of a copying apparatus relating to the embodiment of the present invention.

The copying apparatus is provided with an image reading apparatus A and an image forming apparatus B.

Image reading apparatus A, as described below, transports multiple original documents stacked on a sheet supply section one by one, and performs single face reading, as well as double face reading if necessary to form image data.

In image forming apparatus B, 1 denotes a photoreceptor, which is preferably an organic photoreceptor comprising a photosensitive layer including an organic photoconductor dispersed in resin. The photoreceptor is not restricted to this type, but any known photoreceptor may be utilized.

Further, photoreceptor 1 is not restricted to a drum type as shown in FIG. 1, but may instead be a belt type photoreceptor. Item 2 indicates a charging device, which electrically charges the photoreceptor 1 to form a uniform electric potential on the photoreceptor 1. Charging device 2 is preferably a scorotron charger having a control grid and a charging electrode, or a contact charging type charger using a voltage applied roller.

Item 3 indicates an exposure device to expose image data onto the photoreceptor 1. As exposure device 3, preferable are a scanning exposure device having a scanning optical system comprising a laser diode light source, a polygonal mirror, lens and mirrors; and a scanning optical device comprising a light-emitting diode and an optical fiber image focusing member, however, the exposure device is not meant to be restricted to these types and any known exposure devices may be utilized. Exposure device 3 performs dot exposure on photoreceptor 1 according to image data.

Item 4 indicates a developing device which contains two-component developer or single component developer and develops an electrostatic image on photoreceptor 1 to form a toner image. Item 5 indicates a transfer device including a corona charger. Transfer device 5 charges the recording sheet Pa at the reverse polarity of the toner polarity to transfer the toner image onto the recording sheet Pa. Item 6 indicates a separating device comprising a corona charger. Separating device 6 applies alternating-current corona charging onto recording sheet Pa and neutralizes charges on recording sheet Pa to easily separate it from photoreceptor 1.

Item 7 indicates a fixing device, item 8 indicates a cleaning device, and item 9 indicates a recording sheet container structured with a tray or a cassette, which can be replenished with recording sheet Pa by drawing the container out of the image forming apparatus.

By charging, exposing, and developing, a toner image is formed on photoreceptor 1, and by transfer device 5, the toner image is formed on recording sheet Pa. The toner image is fixed on the recording sheet by fixing device 7. After transfer, photoreceptor 1 is cleaned by cleaning device 8.

Item 10 indicates a reversal transport path 10 to form a rear face image by reversing front/rear faces of recording sheet P and supplying to the image forming section.

Structure of Image Reading Apparatus

Figure 2:
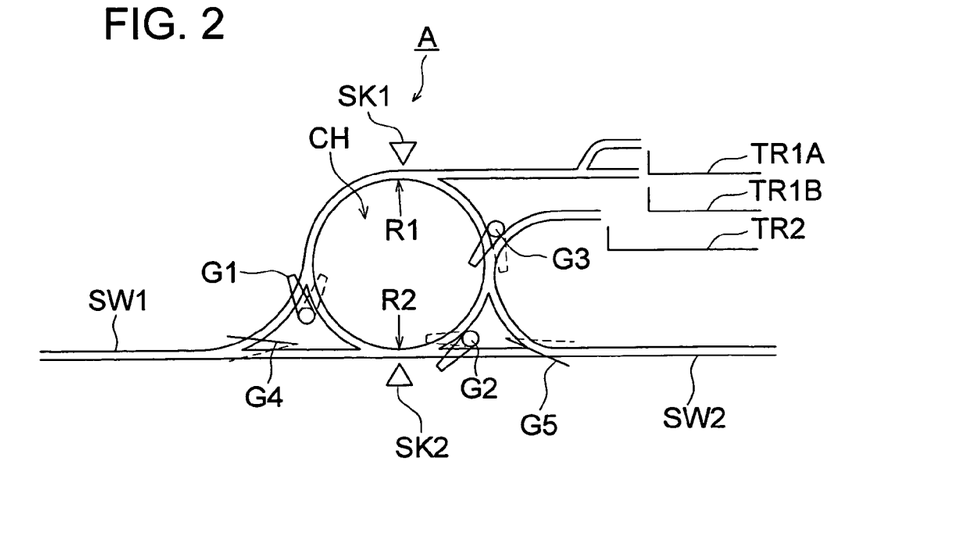
FIG. 2 is a diagram showing a structure of an image reading apparatus relating to an embodiment of the present invention.

FIG. 2 shows a basic structure of the image reading apparatus relating to the embodiment of the present invention.

Image reading apparatus A comprises sheet supply trays TR1A and TR1B as a sheet supplying section; sheet exit tray TR2 as a sheet ejecting section; reading sensor SK1 as a first reading device; reading sensor SK2 as a second reading device; circular transport path CH which is shaped circular and circulates the original document; switchback section SW 1; switchback section SW 2; gates G1 to G3 for switching the transport path; and guide members G4 and G5. Second reading position R2, which is the reading position of the second reading sensor SK2, is arranged at downstream of first reading position R1 of the first reading sensor SK1. First switchback section SW1 is provided at downstream of the first reading position R1 and upstream of the second reading position R2 in the transporting direction of the original document, second switchback section SW2 is provided at downstream of the second reading position R2 and upstream of the first reading position R1 in the transporting direction of the original document.

Regarding reading sensors SK1 and SK2, used can be a reduction imaging optical system, a CCD reading sensor, a contact sensor having a contact type line sensor or the like, which are conventionally known. Each switchback section SW1 and SW2 is structured with a transport path which reverses front/rear faces of the carried-in original document and carries-out it, by executing a switchback transport of the original document. First gate G1, second G2 and third gate G3 are respectively controlled to switch between positions indicated by broken and solid lines. Each of guide members G4 and G5 are composed of a plate member biased by resilient plate member such as PET film or by springs, which is normally placed at the position indicated by solid line, and displaced to positions indicated by broken line to guide the original document in a specific way when the original document passes through and pushes against the guide member.

As shown in FIG. 2, circulating transport path CH, which transports by circulating the original document without reversing front/rear faces, is formed approximately circular. Reading sensors SK1 and SK2 read images on the original documents at the first and second reading positions R1 and R2 located at opposing positions to each other with regard to a center of the circle formed by circulating transport path CH.

Figure 3:
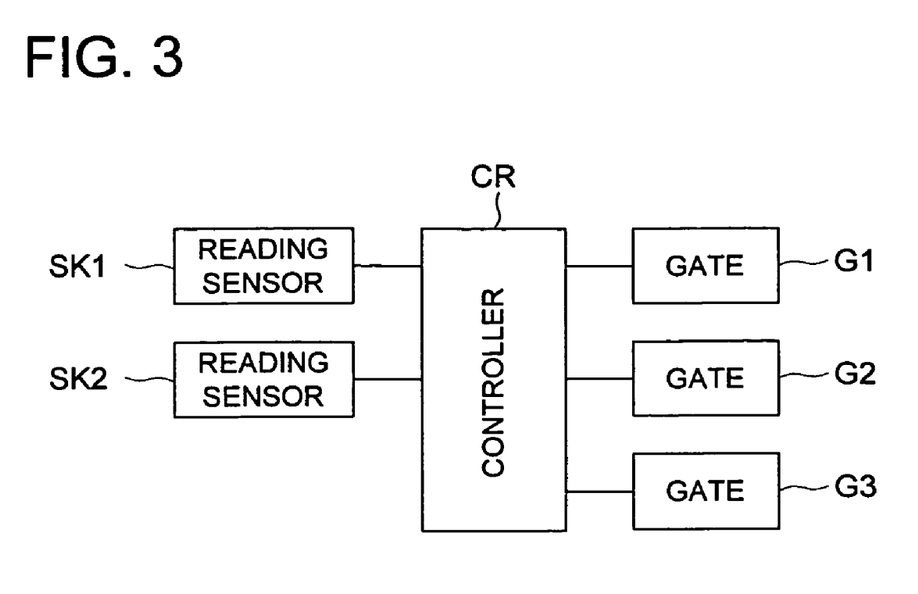
FIG. 3 is a block diagram of a control system in an image reading apparatus shown in FIG. 2.

FIG. 3 is a block diagram of the control system of the image reading apparatus shown in FIG. 2.

As described below, controller CR controls reading sensors SK1, SK2 and gates G1 to G3 to conduct a single face reading and a double face reading by using reading sensors SK1 and SK2, and when any one of reading sensors SK1 and SK2 is in failure, to conduct a single face reading and a double face reading by using reading sensor which is not in failure. Regarding the detection, there is a case where controller CR can detect a failure of reading sensor SK1 or SK2 by monitoring outputs from SK1 and SK2, and another case where the failure is detected by watching output images. Control described below in the case of reading sensor failure is executed by failure detection of controller CR or by operation of an operator.

By using FIGS. 4(a)-4(d) and FIGS. 5(a)-5(i), operations of the image reading apparatus are explained in the case of single face reading and double face reading.

(Single Face Reading)

FIGS. 4(a)-4(d) are diagrams showing operations of an image reading apparatus in the case of single face reading, and FIGS. 5(a)-5(i) are diagrams showing operations of an image reading apparatus in the case of double face reading.

In FIGS. 4(a)-4(d) and FIGS. 5(a)-5(i), in order to avoid complications, notations of other than the reading sensors and the original documents are omitted. The following descriptions refer to the notations shown in FIG. 2. Further, the reading sensor conducting reading operation is illustrated by a solid triangle mark, and the reading sensor inactivated for reading operation is illustrated by an outline triangle mark.

In the case of single face reading, gate 1 and gate 2 respectively reside at positions indicated by solid lines in the drawings not to pass the original document through first switchback section SW1 and second switchback section SW2. Further, gate 3 guides the original document G3 onto exit tray TR2.

As shown in FIG. 4(a), the first original document D1 carried out from sheet supply trays TR1A or TR1B passes through reading position R1 of reading sensor SK1 to be conducted first time reading.

Figure 4:
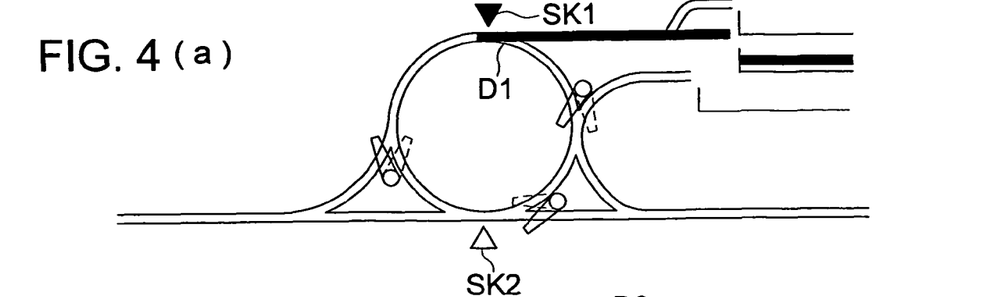
FIGS. 4(a)-4(d) are diagrams showing operations of an image reading apparatus in the case of single face reading.

After the reading by reading sensor SK1, original document D1 guided by gate G1 proceeds to reading position R2, while reading of original document D1 is not conducted by reading sensor SK2 (FIG. 4 (b)).

After passing through second reading position R2, original document D1 is guided by gate G3 to be ejected onto exit tray TR2 (FIGS. 4(c), 4(d)).

Immediately after original document D1 having passed reading position R1 of first reading sensor SK1, second original document D2 is supplied to first reading position R1 (FIG. 4(b)), while reading of original document D2 is not conducted by reading sensor SK1 at the stage shown in FIG. 4(b).

When original document D2 passes through second reading position R2, reading of original document D2 is conducted by reading sensor SK2 (FIG. 4(c)).

Immediately after original document D2 having passed reading position R1, third original document D3 is supplied to first reading position R1 (FIG. 4(c)), while reading of original document D3 is conducted by reading sensor SK1.

Immediately after original document D3 having passed reading position R1, fourth original document D4 is supplied to first reading position R1 (FIG. 4(d)). And when original document passes through reading position R2, reading of original document D3 is not conducted by reading sensor SK2.

In this way, even-numbered original documents D1, D3 . . . are read by reading sensor SK1, and even-numbered original documents D2, D4 . . . are read by reading sensor SK2.

In the period during even-numbered original documents D2, D4 . . . move from first reading position R1 to second reading position R2, the reading is not conducted. Therefore, by conducting higher speed transportation of the original document in this period than the transportation speed during original document reading, overall reading speed of the original documents can be increased.

(Double Face Reading)

In the process of double face reading, gate G1 guides original document into first switchback section SW1, gate G2 guides original document into second switchback section SW2, and gate G3 guides original document into exit tray TR2.

Figure 5:
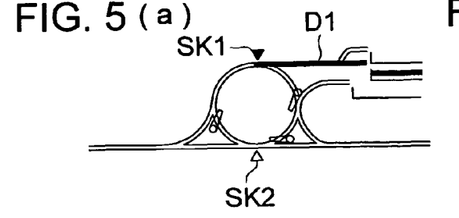
FIGS. 5(a)-5(i) are diagrams showing operations of an image reading apparatus in the case of double face reading.

As shown in FIG. 5(a), the first original document D1 is supplied from sheet supply trays TR1 or TR2, and the first face of the document is read by reading sensor SK1.

As shown in FIGS. 5(b)-5(c), original document D1 is guided by gate G1 into first switchback section SW1.

Original document D1 proceeds from first switchback section SW1 to second reading position R2, and at second reading position R2, reading of the second face is conducted for original document D1 (FIG. 5(d)).

After passing second reading position R2, original document D1 is guided by gate G2 to proceed to second switchback section SW2 (FIG. 5(e)), and is ejected from second switchback section onto exit tray TR2 (FIGS. 5(f), 5(g)).

At the stage when first original proceeds into second switchback section SW2 after the reading of first face (FIG. 5(e)), second original document D2 is supplied to first reading position R1. Regarding original document D2, the first face is read at the stage shown in FIG. 5(e), and the second face is read at the stage shown in FIG. 5(h).

Further, third original document D3 is supplied at the stage shown in FIG. 5(i) when original document D2 proceeds into second switchback section SW2

Next, reading process is described below in cases where reading sensors SK1 or SK2 is in failure.

Example 1

In the Cases Where One of Reading Sensors is in Failure

In the case of single face reading, after the original document is transported nearly one round along circular transport path CH, the original document is guided by gate G3 to be ejected onto exit tray TR2. When reading sensor SK1 at upstream of the transporting direction is in failure, reading is conducted by using reading sensor SK2 at downstream, and when reading sensor SK2 at downstream of the transporting direction is in failure, reading is conducted by using reading sensor SK1 at upstream.

Referring to FIGS. 6(a)-(i), explained is the double face reading in cases where reading sensor SK2 at downstream is in failure.

In the explanation below, FIG. 2 is referred regarding notations of each part. In FIGS. 6(a)-6(i), item numbers are attached only to original documents and reading sensors. Further, the reading sensor conducting reading operation is illustrated by a solid triangle mark, and the reading sensor inactivated for reading operation is illustrated by an outline triangle mark.

Figure 6:
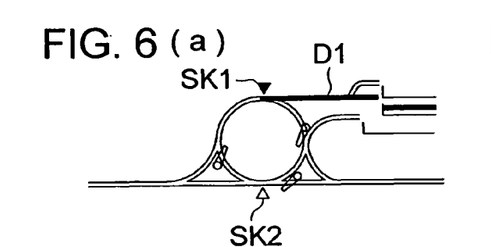
FIGS. 6(a)-6(i) are diagrams showing example operations of an image reading apparatus in the case of double face reading when one of the reading sensors is in failure.

When original document D1 passes through first reading position R1, the first face of the original document (upper face of the stacked original document on sheet supply sections TR1A and TR1B) is read by reading sensor SK1 (FIG. 6(a)).

Original document D1 is guided by gate G1 to proceed into switchback section SW1 (FIGS. 6(b), 6(c)), and from first switchback section SW1, passes through second reading position R2 (FIG. 6(d)).

Since reading sensor SK2 is in failure, reading by reading sensor SK2 is not conducted.

Original document D1 is guided by gate G2 to proceed along circular transport path CH, passes through first reading position R1 (FIG. 6(e)), and when passing through R1, the second face of original document D1 is read by reading sensor SK1.

After passing first reading position R1, original document D1 is guided by gate G1 to proceed into first switchback section SW1 (FIGS. 6(f), 6(g)), and proceeds from first switchback section SW1 to second reading position R2 (FIG. 6(h)).

At the stage shown in FIG. 6(h), reading is not conducted by reading sensor SK2.

After passing second reading position R2, original document D1 is guided by gate G2, which has been switched as shown in the figure, onto exit tray TR2 (FIG. 6(i)).

At the stage shown in FIG. 6(g), when the second face of first original document D1 has been read and D1 resides in first switchback section SW1, second original document D2 is carried into first reading position R1.

Second original document D2 is transported similarly to first original document D1, and reading processes of the first and the second face of D2 are conducted.

Example 2

In the Cases Where One of Reading Sensors is in Failure

Referring to FIGS. 7(a)-7(i), explained is the double face reading in cases where reading sensor SK1 at upstream is in failure.

First original document D1 passes through first reading position R1. At that time, the first face reading of original document D1 is not conducted (FIG. 7(a)).

Figure 7A:
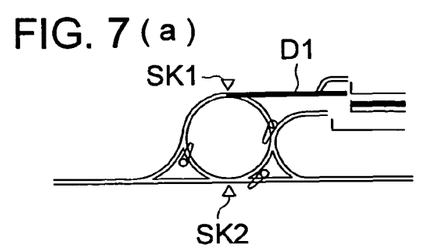
FIGS. 7(a)-7(i) are diagrams showing example operations of an image reading apparatus in the case of double face reading when one of the reading sensors is in failure.
Figure 7B:
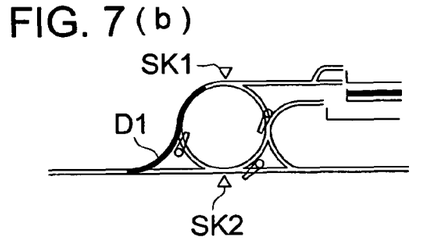
Figure 7C:
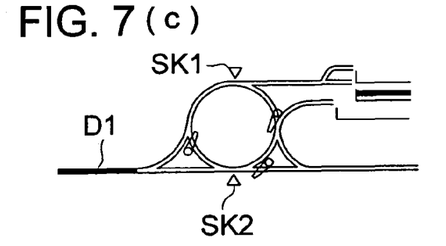
Figure 7D:
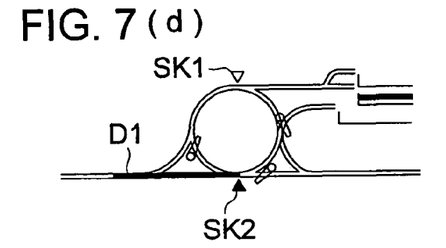

Original document D1 is guided by gate G1 to proceed into switchback section Sw1 (FIGS. 7(b), 7(c)), and proceeds from first switchback section SW1 to pass second reading position R2 (FIG. 7(d)).

At the time of passing second reading position R2, the second face of original document D1 is read by reading sensor SK2.

Figure 7E:
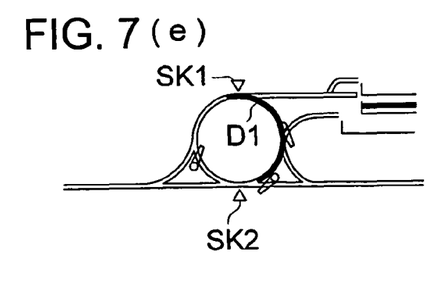

Original document D1 is guided by gate G2 to proceed along circular transport path CH, passes through first reading position R1 (FIG. 7(e)), while at the time of passing through R1, reading of original document D1 is not conducted by reading sensor SK1.

Figure 7F:
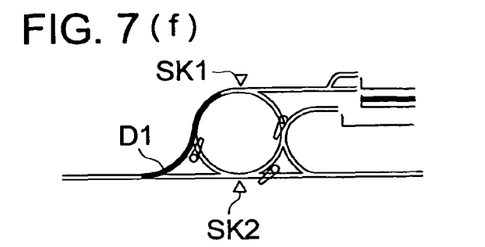
Figure 7G:
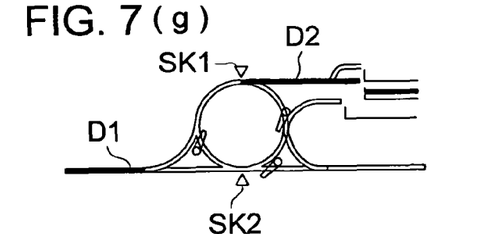
Figure 7H:
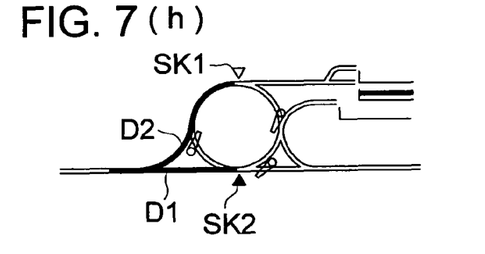

After passing first reading position R1, original document D1 is guided by gate G1 to proceed into first switchback section SW1 (FIGS. 7(f), 7(g)), and proceeds from first switchback section SW1 to second reading position R2 (FIG. 7(h)).

At the stage shown in FIG. 7(h), the first face reading of original document D1 is conducted by reading sensor SK2.

Figure 7I:
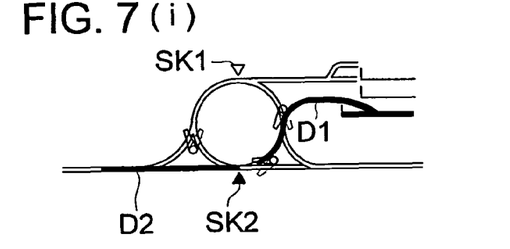

After passing second reading position R2, original document D1 is guided by gate G2, which has been switched as shown in the figure, onto exit tray TR2 (FIG. 7(i)).

At the stage shown in FIG. 7(g), when the second face of first original document D1 has been read and D1 resides in first switchback section SW1, second original document D2 is carried into first reading position R1.

Second original document D2 is transported similarly to first original document D1, and reading processes of the first and the second face of D2 are conducted.

In the case of double face reading shown in FIGS. 7(a)-7(i), the second face of the original document (rear face of stacked document on sheet supply trays TR1A and TR1B) is firstly read, and after that, the first face of the original document (upper face of stacked document on sheet supply trays TR1A and TR1B) is read. Therefore, in the process of image data processing, image data of odd-numbered pages are replaced with those of even-numbered pages such that image data of the first face comes in front of image data of the second face.

Example 3

In the Cases Where One of Reading Sensors is in Failure

Referring to FIGS. 8(a)-8(i), explained is another example of the double face reading in cases where reading sensor SK2 at downstream is in failure.

In the explanation below, FIG. 2 is referred regarding notations of each part. In FIGS. 8(a)-8(i), item numbers are attached only to original documents and reading sensors. Further, the reading sensor conducting reading operation is illustrated by a solid triangle mark, and the reading sensor inactivated for reading operation is illustrated by an outline triangle mark.

FIGS. 8(a)-8(i) show the cases where downstream image sensor SK2 is in failure, and upstream reading sensor SK1 conducts the reading.

Figure 8A:
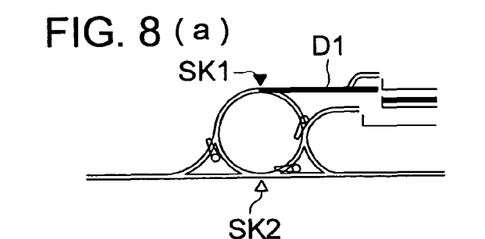
FIGS. 8(a)-8(i) are diagrams showing the other example operations of an image reading apparatus in the case of double face reading when one of the reading sensors is in failure.

When original document D1 passes through first reading position R1, the first face of original document D1 (upper face of the stacked original document on sheet supply sections TR1A and TR1B) is read by reading sensor SK1 (FIG. 8(a)).

Figure 8B:
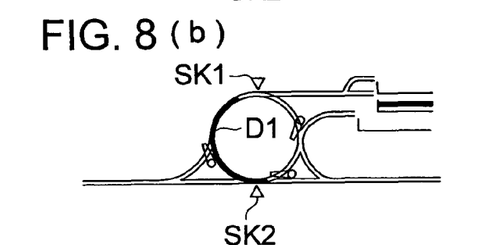

Original document D1 is guided by gate G1 to proceed along circular transport path CH, and passes second reading position R2 (FIG. 8(b)). When original document D1 passes through second reading position R2, original reading is not conducted.

Figure 8C:
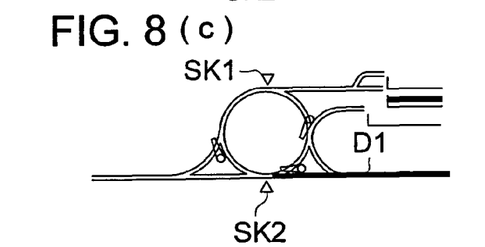
Figure 8D:
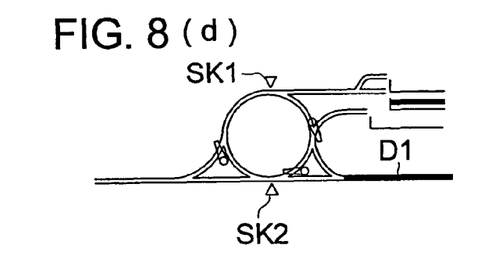
Figure 8E:
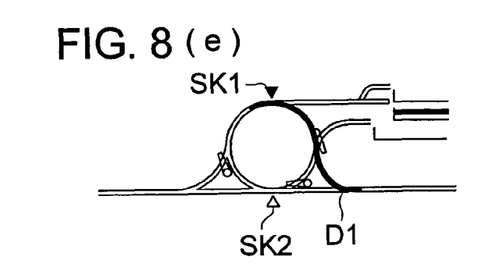

After passing second reading position R2, original document D1 is guided by gate G2 to proceed into second switchback section SW2 (FIG. 8(c)), from second switchback section SW2, D1 is guided by gate G3 to first reading position R1, and the second face of original document D1 is read by reading sensor SK1 (FIG. 8(e)).

Figure 8F:
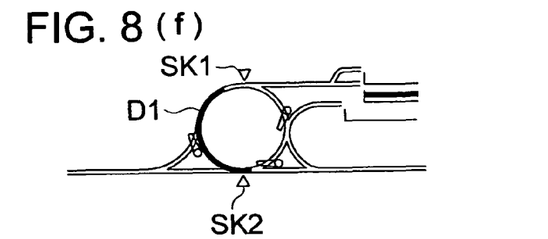

After the reading of the second face, original document D1 is guided by gate G1 to proceed along circular transport path CH, and passes through second reading position R2, while reading is not conducted by reading sensor SK2 (FIG. 8(f)).

Figure 8G:
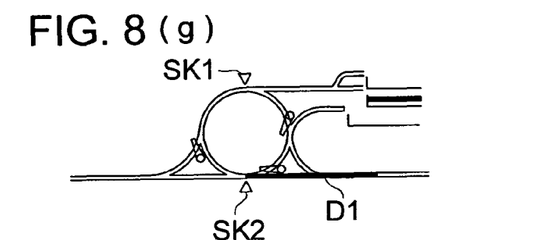
Figure 8H:
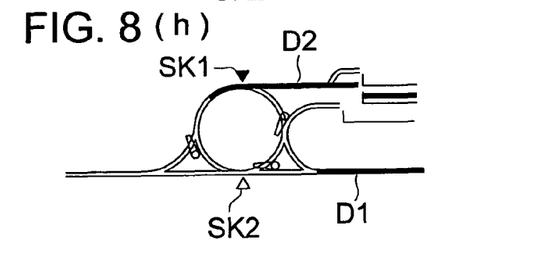
Figure 8I:
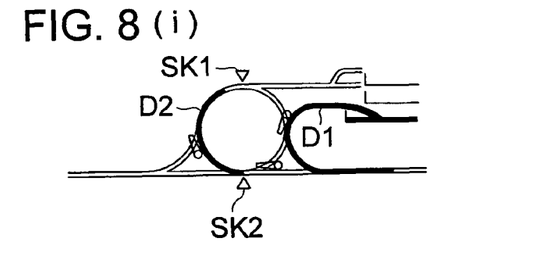

After passing second reading position R2, original document D1 is guided by gate G2 to proceed into second switchback section SW2 (FIG. 8(g)), from second switchback section SW2 guided by gate G3 to be ejected onto exit tray TR2 (FIGS. 8(h), 8(i)).

At the stage shown in FIG. 8(h), when the second face of first original document D1 has been read and D1 resides in second switchback section SW2, second original document D2 is carried into first reading position R1.

Second original document D2 is transported similarly to first original document D1, and after reading processes of the first and the second face of D2 are conducted, D2 is ejected onto exit tray TR2.

Example 4

In the Cases Where One of Reading Sensors is in Failure

Referring to FIGS. 9(a)-9(i), explained is another example of double face reading process in cases where reading sensor SK1 at upstream is in failure.

First original document D1 passes through first reading position R1. At that time, the first face reading of original document D1 is not conducted (FIG. 9(a)).

Figure 9A:
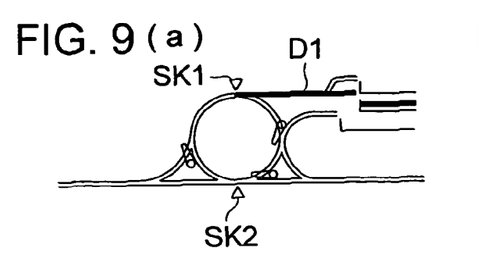
FIGS. 9(a)-9(i) are diagrams showing the further example operations of an image reading apparatus in the case of double face reading when one of the reading sensors is in failure.
Figure 9B:
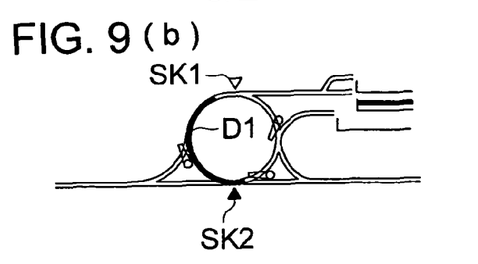

Original document D1 is guided by gate G1 to proceed along circular transport path CH, and passes through second reading position R2 (FIG. 9(b)). At the time of passing second reading position R2, the first face of original document D1 is read by reading sensor SK2.

Figure 9C:
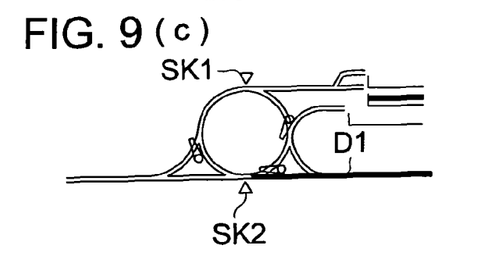
Figure 9D:
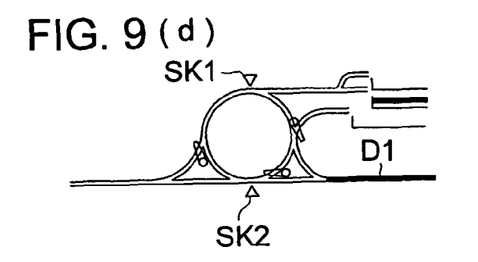
Figure 9E:
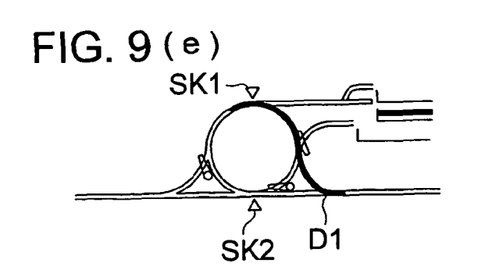

After passing second reading position R2, original document D1 is guided by gate G2 to proceed into second switchback section SW2 (FIG. 9(c)), from second switchback section SW2, D1 is guided by gate G3 to first reading position R1, while reading of original document D1 is not conducted by reading sensor SK1 (FIG. 9(e)).

Figure 9F:
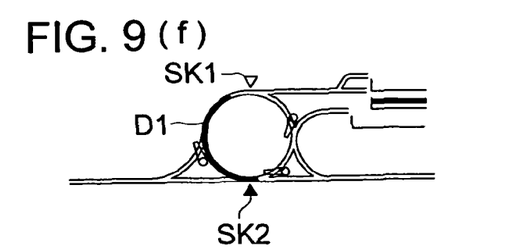

After passing through first reading position, original document D1 is guided by gate G1 to proceed along circular transport path CH, and passes through second reading position R2, while second face reading of original document D1 is conducted by reading sensor SK2 (FIG. 9(f)).

Figure 9G:
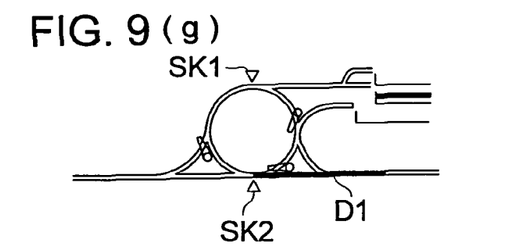
Figure 9H:
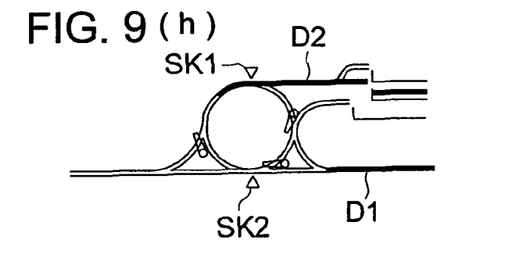
Figure 9I:
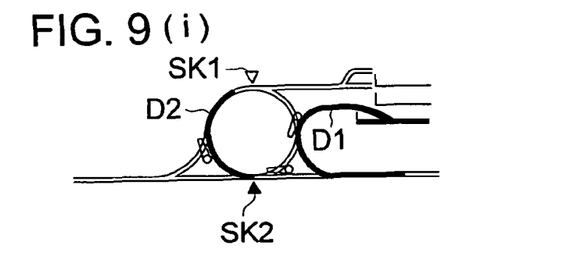

After passing second reading position R2, original document D1 is guided by gate G2 to proceed into second switchback section SW2 (FIGS. 9(g), 9(h)), from second switchback section SW2 guided by gate G3 to be ejected onto exit tray TR2 (FIG. 9(i)).

At the stage shown in FIG. 9(h), when the second face of first original document D1 has been read and D1 resides in second switchback section SW2, second original document D2 is carried into first reading position R1.

Second original document D2 is transported similarly to first original document D1, and after reading processes of the first and the second face of D2 are conducted, D2 is ejected onto exit tray TR2.

Example 5

In the Cases Where One of Reading Sensors is in Failure

Referring to FIGS. 10(a)-10(i), explained is another example of double face reading process in cases where reading sensor SK1 at upstream is in failure and reading sensor SK2 at downstream conducts reading process.

Figure 10:
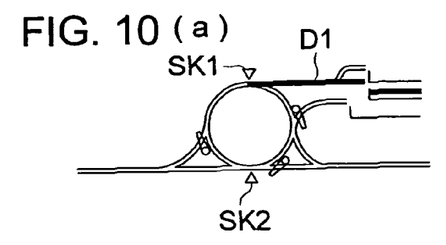
FIGS. 10(a)-10(i) are diagrams showing the furthermore example operations of an image reading apparatus in the case of double face reading when one of the reading sensors is in failure.

First original document D1 passes through first reading position R1 (FIG. 10(a)). At that time, the reading of original document D1 is not conducted by reading sensor SK1.

Original document D1 is guided by gate G1 to proceed along circular transport path, and passes through second reading position R2. At the time of passing second reading position R2, the first face of original document D1 is read by reading sensor SK2 (FIG. 10(b)).

After passing second reading position R2, original document D1 is guided by gate G2 and gate G3 to proceed along circular transport path CH, and passes through first reading position R1 (FIG. 10(c)), while reading of original document D1 is not conducted by reading sensor SK1.

After passing through first reading position R1, original document D1 is guided by gate G1, which has been switched, to proceed into first switchback section SW1 (FIG. 10(d)).

From first switchback section SW1, original document D1 passes through second reading position R2, while second face reading of original document D1 is conducted by reading sensor SK2 (FIG. 10(f)).

After passing through second reading position R2, original document D1 is guided by gate G2, which has been switched, to proceed into second switchback section SW2 (FIG. 10(g)).

From second switchback section SW2, original document D1 is guided by gate G3, which has been switched, to be ejected onto exit tray TR2 (FIG. 10(i)).

At the stage shown in FIG. 10(h), when first original document D1 resides in second switchback section SW2, second original document D2 is carried into first reading position R1. At the stage shown in FIG. 10(i), when D2 passes through second reading position R2, the first face reading of second original document D2 is conducted.

According to the present embodiments, even in cases where any one of two reading sensors is in failure, double face reading can be conducted, and reading speed of double face reading is not extremely lowered. In the case of normal operation where double face reading is conducted by two reading sensors, high reading speed-compatible to the image forming speed can be achieved, and further, even in cases where any one of two reading sensors is in failure, double face reading can be conducted with comparatively high speed, therefore, a totally high efficiency image reading apparatus can be realized.

Further, by combining an image reading apparatus of the present embodiments with an image forming apparatus, a high productivity copying apparatus can be realized.

What is claimed is:

1. An image reading apparatus comprising:
  a circulating transport path configured to transport original documents with recirculation, wherein the original documents are transported along a surface of the circulating transport path;
  a first reading device to read an image of an original document at a first reading position on the circulating transport path;
  a second reading device to read an image of the original document at a second reading position which is located on the circulating transport path downstream of the first reading position in a transporting direction of the original document wherein the first reading position and the second reading position are located at the same side of the surface of the circulating transport path;
  a first switchback section, for conveying the original document with switchback transportation, provided downstream of the first reading position and upstream of the second reading position in the transporting direction of the original document;
  a second switchback section, for conveying the original document with switchback transportation, provided downstream of the second reading position and upstream of the first reading position in the transporting direction of the original document;
  a first gate to switch a transporting direction of the original document, the first gate being provided at a branching point of the circulating transport path and the first switchback section;
  a second gate to switch a transporting direction of the original document, the second gate being provided at a branching point of the circulating transport path and the second switchback section;
  a sheet exit path provided downstream of the second reading position in the transporting direction of the original document;
  a third gate to switch a transporting direction of the original document, the third gate being provided at a branching point of the circulating transport path and the sheet exit path; and
  a controller, wherein the controller controls the first gate, the second gate and the third gate such that: in a first mode, the original document is transported through both of the first switchback section and the second switchback section, each image on both faces of the original document is respectively read by each of the first reading device and the second reading device; and in a second mode, the original document is transported through at least one of the first switchback section and the second switchback section, and images on both faces of the original document are read only by the first reading device or only by the second reading device.

2. The image reading apparatus of claim 1, wherein the controller controls such that the original document is not transported neither into the first switchback section nor into the second switchback section, and an image on a single face of the original is read by any one of the first reading device or the second reading device.

3. The image reading apparatus of claim 1, wherein in cases where the second reading device is inoperative when reading images on both faces of the original document, the controller controls such that: after an image on the front face of the original document is read by the first reading device, the original document is sent into the first switchback section, the original document reversed by switchback is transported via the circulating transport path, through the second reading position, and to the first reading position; after an image on a rear face of the original document is read by the first reading device, the original document is sent into the first switchback section again, and the original document reversed by switchback is transported through the second reading position to be ejected onto the sheet exit path.

4. The image reading apparatus of claim 1, wherein in cases where the first reading device is inoperative when reading images on both faces of the original document, the controller controls such that: the original document is transported through the first reading position into the first switchback section; after an image on a rear face of the original document, which is reversed by switchback, is read by the second reading device, the original document is transported via the circulating transport path to pass through the first reading position; the original document is sent into the first switchback section again and the original document reversed by switchback is transported to the second reading position; and after an image on a front face of the original document is read by the second reading device, the original document is transported to be ejected onto the sheet exit path.

5. The image reading apparatus of claim 1, wherein in cases where the second reading device is inoperative when reading images on both faces of the original document, the controller controls such that: after an image on the front face of the original document is read by the first reading device, the original document is transported via the circulating transport path, through the second reading position, into the second switchback section; the original document reversed by switchback is transported via the circulating transport path to the first reading position; after an image on a rear face of the original document is read by the first reading device, the original document is sent via the circulating transport path, through the second reading position, into the second switchback section again; and the original document reversed by switchback is transported to be ejected onto the sheet exit path.

6. The image reading apparatus of claim 1, wherein in cases where the first reading device is inoperative when reading images on both faces of the original document, the controller controls such that: the original document is transported through the first reading position, via the circulating transport path, to the second reading position; after an image on a front face of the original document is read by the second reading device, the original document is sent into the second switchback section; the original document reversed by switchback is transported via the circulating path, through the first reading position, to the second reading position; and after an image on a rear face of the original document is read by the second reading device, the original document is sent again into the second switchback section to be reversed, and transported to be ejected onto the sheet exit path.

7. The image reading apparatus of claim 1, wherein in cases where the first reading device is inoperative when reading images on both faces of the original document, the controller controls such that: the original document is transported through the first reading position, via the circulating transport path, to the second reading position; after an image on a front face of the original document is read by the second reading device, the original document is transported via the circulating path, through the first reading position, into the first switchback section; and after an image on a rear face of the original document reversed by switchback is read by the second reading device, the original document is sent into the second switchback section to be reversed again, and transported to be ejected onto the sheet exit path.

8. A copying apparatus comprising:
the image reading apparatus described in claim 1; and
an image forming apparatus to form images on both front and rear faces of a recording sheet based on an image data having been read by the image reading apparatus, the image forming apparatus having a reversing transport path to reverse front/rear faces of the recording sheet.

* * * * *